United States Patent [19]

Mitchell

[11] Patent Number: 4,904,983
[45] Date of Patent: Feb. 27, 1990

[54] ALARM SYSTEM

[76] Inventor: Steven Mitchell, 108 Brentmoor Road, Bramhall, Cheshire, England

[21] Appl. No.: 49,227

[22] Filed: May 13, 1987

[30] Foreign Application Priority Data

Jun. 5, 1986 [GB] United Kingdom ................. 8613694
Aug. 2, 1986 [GB] United Kingdom ................. 8618948

[51] Int. Cl.⁴ ..................... G08B 25/02; B60R 25/10
[52] U.S. Cl. ................... 340/426; 340/539; 379/40
[58] Field of Search ............ 379/40, 41, 59, 51; 360/12; 369/21; 340/539, 426

[56] References Cited

U.S. PATENT DOCUMENTS

| 4,234,874 | 11/1980 | Saya ................................. 340/539 |
| 4,577,182 | 3/1986 | Millsap et al. ..................... 340/539 |
| 4,658,096 | 4/1987 | West, Jr. et al. ..................... 379/59 |
| 4,716,582 | 12/1987 | Blanchard et al. .................. 379/40 |
| 4,742,336 | 5/1988 | Hall et al. ........................... 340/539 |
| 4,794,368 | 12/1988 | Grossheim et al. ................ 340/539 |

FOREIGN PATENT DOCUMENTS 011444 5/1980 European Pat. Off.

Primary Examiner—Glen R. Swann, III
Attorney, Agent, or Firm—Oblon, Spivak, McClelland, Maier & Neustadt

[57] ABSTRACT

An alarm system for e.g. vehicles has an alarm condition detector, an auto-dialing mechanism activated by the detector and a radio telephone connected by the auto-dialler to an alarm receiving station. A recording includes a message noting the location of the vehicle when left sent as part of the alarm message.

7 Claims, 1 Drawing Sheet

ALARM SYSTEM

BACKGROUND TO THE INVENTION

This invention relates to alarm systems—for example, theft or intruder alarms—for vehicles and other movable entities such for example as motor cars, trucks, caravans, boats and even, simply, a movable alarm system aggregate per se which can be made portable so as to be carried around a plurality of fixed structures such as building sites.

Alarm systems are known in which a triggered alarm actuates an autodialler system which in turn communicates via a telephone or radio link to a computer. Such systems identify the location of the installation by a recorded message, either a recorded voice message or a digitally encoded message, and also can identify the problem being encountered, whether it be a fire, intruder or whatever, as well, in more sophisticated systems, as giving zonal information useful to the police or other security organisation monitoring the alarm system to locate the problem in a large installation.

SUMMARY OF THE INVENTION

The present invention provides an improved such system useful for movable entities such as vehicles or as a portable alarm system for temporarily alarming different premises which might for example comprise building sites, which might not even be connected to a telephone system.

The invention comprises an alarm system for vehicles and other movable entities comprising alarm means detecting a desired alarm condition, auto-dialling means activated by the alarm means, and radio-telephone means connected by the auto-dialling means to an alarm receiving station, and recording means for a two-part message to be broadcast to the auto-dialled number by the radio-telephone means, the message comprising fixed information identifying the vehicle or other movable entity and variable information identifying the location of the vehicle or other movable entity, and means to record said variable information.

Said radio-telephone means may comprise a cellular radio system transmitter.

The two-part message may be recorded as a voice message. The fixed information may be normally inaccessible to a mechanism provided for recording the variable information. Separate tape means may be used for the fixed and variable information, the system being adapted to play such different tape means at different times during the message broadcast.

The two-part message may however comprise a digital message, the fixed information at least being in digital form.

BRIEF DESCRIPTION OF THE DRAWINGS

Embodiments of alarm systems according to the invention will now be described with reference to the accompanying drawings, in which.

DETAILED DISCLOSURE OF THE PREFERRED EMBODIMENTS

Figure 1:
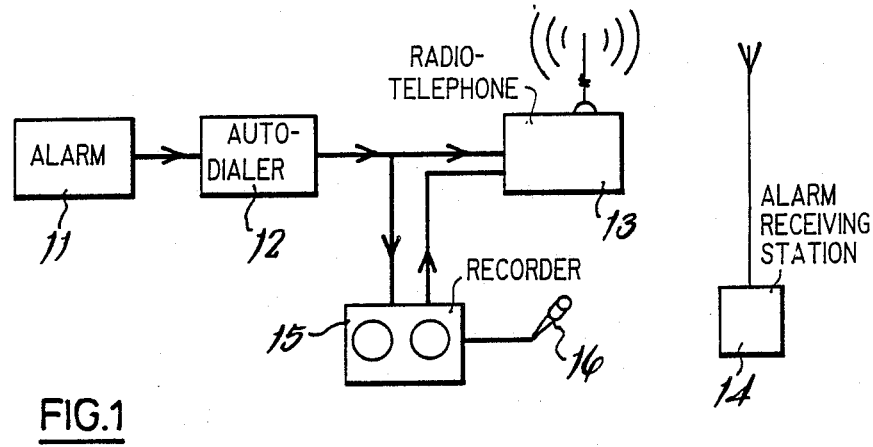
FIG. 1 is a schematic illustration of a first embodiment.

The Figures illustrate alarm systems for vehicles and other movable entities comprising alarm means 11 detecting a desired alarm condition, auto-dialling means 12 activiated by the alarm means 11, and radio-telephone means 13 connected by the auto-dialling means 12 to an alarm- receiving station 14, and recording means 15 for a two-part message to be broadcast to the auto-dialled number by the radio-telephone means 13.

The two part message comprises fixed information relating in the case of an automobile for example to the make and model, colour and registration number of the vehicle as well as the owner's name and address. The variable information is input via a microphone 16 at the time the vehicle is left unattended and will include principally the location at which it is left as well perhaps in the case of a goods vehicle as details about its load.

The system is capable of varying degrees of sophistication.

FIG. 1 illustrates a relatively simply system in which the alarm 11 is wired in to the vehicle's ignition to trip the auto-dialler whenever the ignition is switched on—the alarm itself can be activated by a key or keypad and would be deactivated by an authorized driver in possession of the key or combination. The recording means 15 comprise a tape recorder—the pocket memo type is suitable—with the fixed information recorded on a first part of the tape, the rest of the tape being available for the variable information, which is simply spoken into the microphone 16 of the recorder 15.

The tape is rewound to the beginning when the alarm is set—this may be done manually in a very simple arrangement, or automatically in accordance with conventional telephone answering machine technology in a more sophisticated arrangement, which might also provide for automatic location of the tape at the beginning of the variable information section e.g. by a marker on the tape or by switch means associated with the tape counter. Interlocks may be arranged in conventional fashion to prevent recording on the fixed information section except when the information is first put in, all as is conventional with telephone answering equipment.

Separate tapes, of course, could be used for the fixed and variable information.

Figure 2:
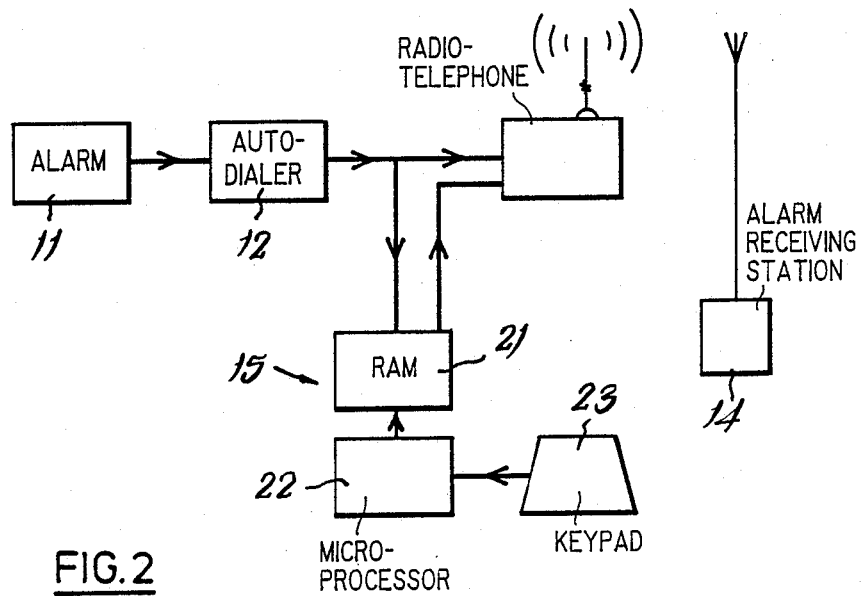
FIG. 2 is a schematic illustration of a second embodiment.

FIG. 2 illustrates an arrangement in which the recording means 15 comprise means for storing digital information. The store comprises a non-volatile RAM 21 connected to a microprocessor 22 with a keypad 23. Here, again, varying degrees of sophistication can be used. The keypad 23 might in a simple arrangement be simply a numeric keypad, the fixed information being input according to a code, with, for example, a Ford being assigned code number 10, an Escort being assigned number 21, red being 04 and so on, so that 102104823 would indicate that the vehicle is a red Ford Escort with the numbers 823 on its registration plate.

The variable information might be put in then as a grid reference.

An alphanumeric keypad would naturally be more user-friendly in enabling all of the information to be input in more natural language viz as "Red Ford Escort BNA 823 Y" and "Corner of High Street and Water Lane, Wilmslow, facing South".

The fixed information could of course be held in ROM.

A hybrid system could be used, of course, with the fixed information held in ROM or otherwise digitally, the variable information being orally input via a tape recorder; while this might be the most convenient, it might pose greater problems at the monitoring station to which the cellular radio transmits the message.

Either part of the information may of course contain information that the call is an alarm call. A more sophisticated system can have different alarm states—thus alarms might be rigged to detect intruders who leave the vehicle stationary, merely stealing from it, intruders who drive the vehicle away or move it unduly as by loading a motor car on to a trailer, fire and so on.

The advantage of digital information is that it can be transmitted very quickly and can be arranged to be transmitted several or indeed many times over, the better to ensure good reception at the monitoring station. The message then stands a good chance of getting out before the system can be disabled by an intruder.

The alarm 11 can also of course raise an audible alarm or disable the vehicle as by opening the ignition circuit or locking up the brakes.

The radio might also be arranged to transmit a regular signal for triangulation so that, given an adequate triangulation facility at the monitoring station, a vehicle can be tracked. The transmitter could be secured so as to be relatively inaccessible to guard against interference preventing such regular signal getting out.

Since the systems described could be defeated obviously by breaking off an external aerial before attempting entry, it is desirable that such external aerial be itself alarmed or an inaccessible aerial be used for example an internal aerial difficult enough to get at to leave time for the alarm message to be transmitted.

Various modifications can be made to the system incorporating the various elements described and indeed other convention alarm, auto-dialling, telephone answering, microprocessing and radio, especially cellular radio technology, all in accordance with the invention.

The system might for example be developed as a packaged portable alarm system e.g. for the temporary protection of building sites and other premises, the variable information being the present location of the equipment.

The alarms will be selected appropriately for the vehicle or premises being monitored. Thus passive IR alarms, vibration detectors, heat and smoke detectors, pressure change detectors and so on can all be used according to circumstances.

The system could also be arranged to transmit to the vehicle or other entity owner's home number or to any other number.

I claim:

1. An alarm system for vehicles and other movable entities, comprising:
    alarm means for detecting a desired alarm condition;
    auto dialing means activated by the alarm means;
    radiotelephone means actuated by the auto dialing means for being put in radiotelephonic connection with an alarm receiving station;
    recording means for recording a two-part message which message is to be broadcast to the alarm receiving station by the radiotelephone means;
    said message comprising fixed information identifying the vehicle or other movable entity and variable information identifying the present location of the vehicle or other movable entity; and
    means for recording said variable information adapted to be used each time the vehicle or other movable entity is left at a new location and for informing the alarm receiving station that there is an alarm condition, which vehicle or other movable entity the alarm condition is associated with, and the present location of said vehicle or other movable entity.

2. An alarm system according to claim 1, in which said radio-telephone means comprise a cellular radio system transmitter.

3. An alarm system according to claim 1, in which the two-part message is recorded as a voice message.

4. An alarm system according to claim 3, in which the fixed information message is normally inaccessible to the means for recording the variable information.

5. An alarm system according to claim 4, using separate tape means for the fixed and variable information and being adapted to play such different tape means at different times during the message broadcast.

6. An alarm system according to claim 1, in which the two part message comprises a digital message.

7. An alarm system according to claim 6, in which the fixed information is in digital form.

* * * * *